(12) United States Patent
Morton et al.

(10) Patent No.: US 6,404,835 B1
(45) Date of Patent: Jun. 11, 2002

(54) NUCLEAR REACTOR ROD DROP TIME TESTING METHOD

(75) Inventors: Gregory W. Morton; Casey D. Sexton; Danny D. Beverly; Hashem M. Hashemian, all of Knoxville, TN (US)

(73) Assignee: Analysis & Measurement Services Corporation, Knoxville, TN (US)

( * ) Notice: Subject to any disclaimer, the term of this patent is extended or adjusted under 35 U.S.C. 154(b) by 0 days.

(21) Appl. No.: 09/532,634

(22) Filed: Mar. 22, 2000

(51) Int. Cl.[7] ............................ G21C 17/00; G21C 7/06
(52) U.S. Cl. ...................... 376/245; 376/228; 376/258; 376/259
(58) Field of Search ................................ 376/240, 258, 376/259, 233, 215, 216, 245, 976, 228; 318/685

(56) References Cited

U.S. PATENT DOCUMENTS

| | | | |
|---|---|---|---|
| 4,314,881 A | * 2/1982 | Wu | 376/245 |
| 4,668,465 A | * 5/1987 | Boomgaard et al. | 376/216 |
| 5,006,301 A | * 4/1991 | Lexa | 376/259 |
| 5,076,996 A | * 12/1991 | Miyaguchi et al. | 376/240 |
| 5,408,508 A | 4/1995 | Federico et al. | 376/258 |
| 5,963,610 A | * 10/1999 | Falvo et al. | 376/259 |
| 5,999,583 A | * 12/1999 | Pysnik et al. | 376/228 |
| 6,118,837 A | * 9/2000 | Krien et al. | 376/258 |

OTHER PUBLICATIONS

Hashemian, H. M, and Fain, R. E., "Experience With Measurement of Drop Time for Control and Shutdown Rods and Testing of CRDMs in Nuclear Power Plants," pp. 259–271, 1995.*
Fain, R. E., Petersen, K.M., and Hashemian, H. M, "New Equipment for Rod Drop and Control Rod Drive Mechanism Timing Test in PWRs," pp. 371–381, 1995.*
Westinghouse Electric Corporation Descriptive Bulletin Nuclear I&C No. DB21N–504 "Automatic Multiple Rod Drop Test System," 1993.*
Analysis and Measurement Services Corporation Technical Bulletin No. RD9401 "Rod Drop and CRDM Timing Tests in PWRs," 1994.*

* cited by examiner

Primary Examiner—Charles T. Jordan
Assistant Examiner—Daniel Matz
(74) Attorney, Agent, or Firm—Pitts & Brittian, P.C.

(57) ABSTRACT

A method for measuring the drop time of a rod in nuclear reactor with the rod position indication system coils remaining energized. The signal generated at the coils includes both the rod drop trace and the coil power. A filter is applied to separate the rod drop trace from the coil power. The drop time of all rods in a reactor can be measured simultaneously in a single test. Furthermore, the test data results are plotted automatically with plot overlay capability to compare rod drop traces to the results of previous tests or to compare an individual rod to another within the same test.

12 Claims, 4 Drawing Sheets

NUCLEAR REACTOR ROD DROP TIME TESTING METHOD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates to a method for measuring the drop time for the control and shutdown rods of a nuclear reactor. Specifically, the present invention relates to a method for measuring the drop time for the control and shutdown rods of a nuclear reactor where the coils in the rod position indication system remain energized. In addition, the present invention provides test results, test traces and overlay capability and allows one to measure the drop time of all control and shutdown rods in one test thereby reducing test time which provides substantial economic benefits to the plant.

2. Description of the Related Art

In a nuclear power plant, electricity is produced from heat that is generated in a reactor core. The heat is thermally transferred from the reactor core to water flowing through a water cooling system. The heater water passes through a heat exchanger where it produces steam to drive a turbine which generates electricity.

FIGS. 1 and 2 illustrate the relationship between a nuclear reactor 10 and the control and shutdown rods 12. The reactor core 14 is a chamber which contains the nuclear fuel. The operation of the nuclear reactor 10 is governed by a set of rods 12 which are inserted into and removed from the reactor core 14. The rods 12 are formed from a material which absorbs the radiation emitted by the nuclear fuel. To start the reactor 10, the rods 12 are removed from the reactor core 14 allowing the nuclear reaction to occur. While the reactor 10 is operating, the rods 12 are kept above the reactor core 14, as illustrated in FIG. 1.

In case of a nuclear mishap, the reactor 10 must be shut down as quickly as possible. To accomplish this, the rods 12 are inserted into the reactor core 14 to stop the nuclear reaction. The emergency insertion of the rods 12 is accomplished by releasing the rods 12 to gravity. The time required for each rod 12 to traverse the distance from the top of the reactor core 14 to the bottom of the reactor core 14 and come to rest in a dashpot 16 provided at the bottom of the reactor core 14 is referred to as the "drop time." The drop time is critical and must be measured periodically, typically after refueling or maintenance of the reactor, to ensure that the rods fall within a specified amount of time.

FIG. 3 illustrates a conventional rod position indication system 20. The rod position indication system 20 includes a number of circular coils 22 encircling a rod housing 24 which guides the drop path of the rod 12. During normal operation of the reactor 10, the circular coils 22 are energized. However, in the prior art, drop time measurements require a special procedure wherein the coil power is turned off. Once the power is off, the rods 12 are moved to the position above the reactor core 14 and released. As the rod 12 moves through the coils 22, the coils 22 generate a signal representative of the speed at which the rod 12 falls. This signal is recorded and used to calculate the drop time for each rod 12.

The prior art method is encumbered with a number of limitations. First, drop time measurements can not be taken automatically in the event of an actual mishap or a reactor trip. Second, taking drop time measurements using the prior art method could only occur after the nuclear reactor has been intentionally shut down for refueling or maintenance. Then, a lengthy procedure is employed to turn off the coils for testing purposes. This results in unnecessary wear and tear on the switchgears controlling the coil power. The reliability of these switchgears is of concern in nuclear power plants. Finally, test results are not available in real time with the prior art method nor are the test results calculated automatically and printed out with overlay capability. The operator does not have any indication of the rod position while the test is in progress.

Accordingly, there is a need for a method for measuring the drop time of the control and shutdown rods in a nuclear reactor with the coil power remaining on. The method need be capable of producing contemporaneous information of the rod position while the test is in progress and allow testing of all control and shutdown rods in one test as well as analyzing the test data automatically and producing results automatically in terms of rod drop traces that are plotted and rod drop time results that are automatically tabulated. Further, the method should reduce the wear and tear placed upon the switchgears controlling the coil power and reduces the time that is required to perform the rod drop tests. This reduction in test time is important to the plant from an economic standpoint.

Therefore, it is an object of the present invention to provide a method for measuring the drop time of control and shutdown rods in a nuclear reactor with the rod position indication system coils remaining energized.

It is another object of the present invention to provide a method for measuring the drop time of control and shutdown rods in a nuclear reactor which provides rod position information to the operator while the test is in progress.

It is a further object of the present invention to provide a method for measuring the drop time of control and shutdown rods in a nuclear reactor which does not place unnecessary wear and tear on the components of the nuclear reactor, does not require a lengthy procedure to turn off the power to rod position indication coils, and produces the test results automatically upon completion of the tests.

BRIEF SUMMARY OF THE INVENTION

A method for measuring the drop time of a control and/or a shutdown rod in a nuclear power plant is disclosed. The drop time of rods in nuclear reactors is measured with the coils remaining energized. The signal generated at the coils while the rod passes through the rod housing includes both the rod drop trace and the coil power. By applying a filter, the rod drop trace is separated from the coil power producing the same drop time results as would be obtained using the prior art method. Those skilled in the art will recognize that the filter can be either analog, digital, or a combination of both and be accomplished using either hardware or software. Once the rod drop trace has been isolated from the coil power, the drop time is calculated and a report is generated which may include the date and time of the event, the measured signal at the coils, the filtered rod drop trace, and the calculated drop time.

By taking the measurement while the coils encircling the rod housing remain energized, the method allows drop time measurements to be taken automatically in the event of any reactor trip. Additionally, unnecessary wear and tear on the switchgears controlling the coil power is avoided by eliminating the need to turn off the coil power. Finally, test results are available in real time while providing the operator with an indication of the rod position while the test is in progress.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
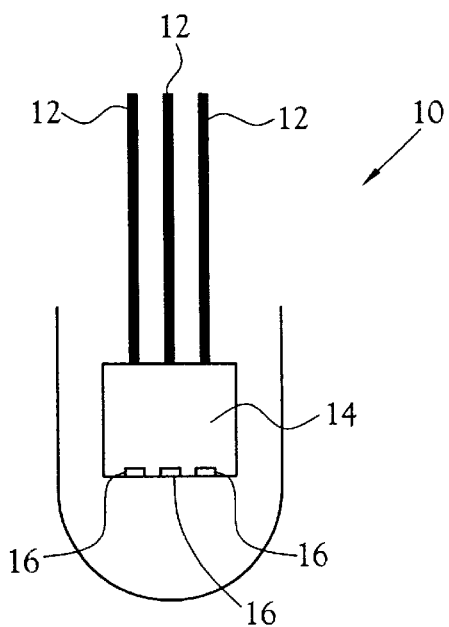
FIG. 1 is an illustration of a nuclear reactor ready for operation with a set of control or shutdown rods positioned above the reactor core.
Figure 2:
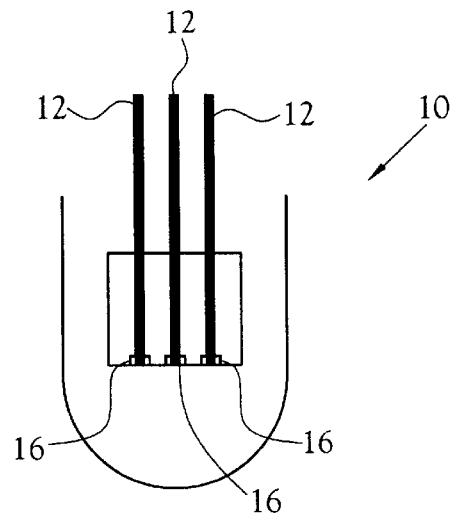
FIG. 2 is an illustration of a nuclear reactor in a shutdown state with a set of control or shutdown rods inserted into the reactor core.
Figure 3:
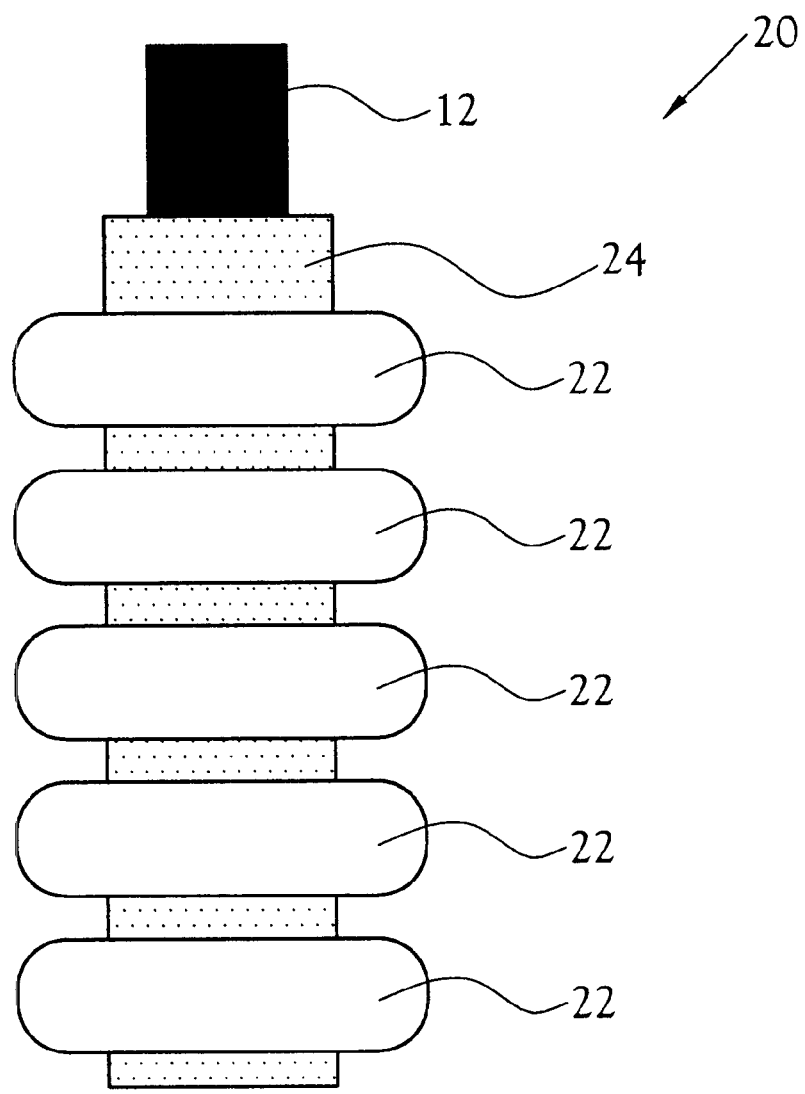
FIG. 3 is an illustration of a conventional rod position indication system for use with the method of the present invention.
Figure 4:
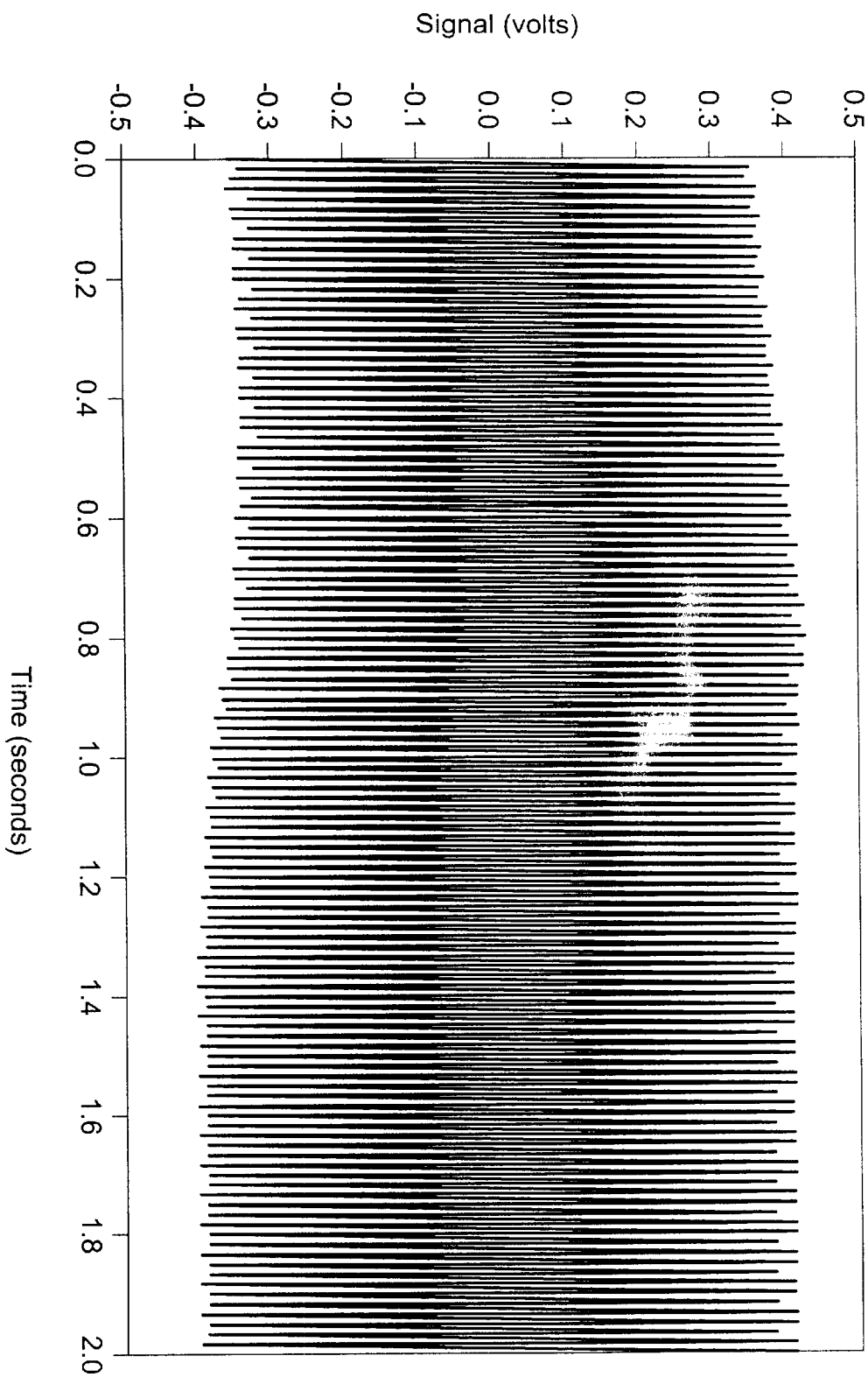
FIG. 4 is an illustration of the signal obtained from the rod position indication system of FIG. 3 using the method of the present invention.
Figure 5:
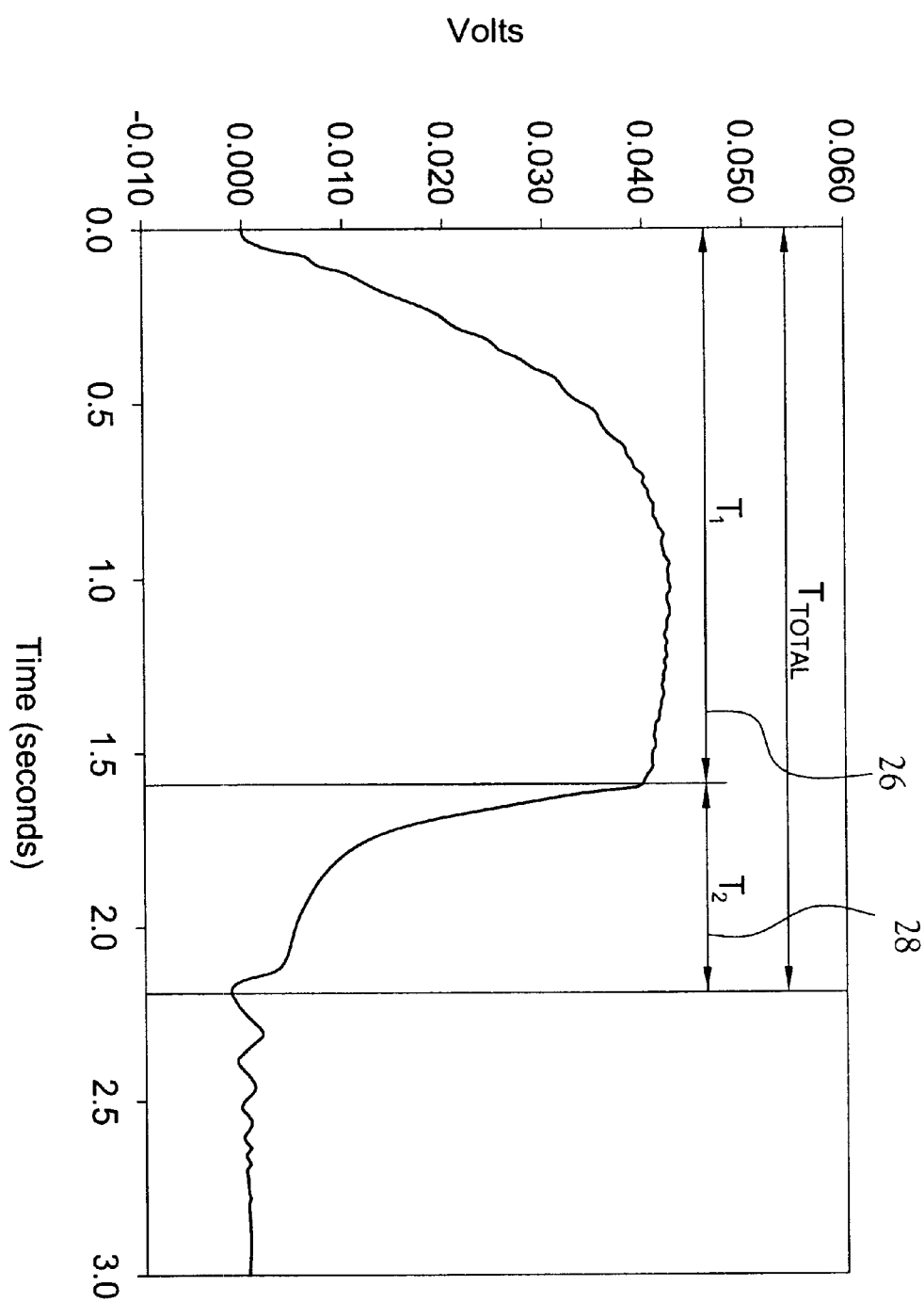
FIG. 5 is an illustration of a rod drop trace obtained after applying a filter to the signal illustrated in FIG. 4.

A method for measuring the drop time of a control and/or a shutdown rod in a nuclear power plant is disclosed. To describe the method of the present invention, it is useful to refer again to FIG. 3 which illustrates a conventional rod position indication system. In the present invention, the drop time of the rod 12 in nuclear reactor 10 is measured with the coils 22 remaining energized. In the preferred embodiment, the drop time is measured for all of the rods 12 simultaneously in a single test. FIG. 4 illustrates the signal generated at the coils 22 which includes both the rod drop trace and the coil power for each rod 12. By applying a filter, the rod drop trace, such as that illustrated in FIG. 5, is separated from the coil power producing the same drop time results as would be obtained using the prior art method. Those skilled in the art will recognize that the filter can be either analog, digital, or a combination of both and be accomplished using either hardware or software.

A number of filtering approaches may be used to isolate the rod drop trace from the coil power measurement. The filter may be a fixed filter based upon known characteristics of either the rod drop trace or the coil power or a variable or programmable filter using actual coil power measurements to separate the coil power from the rod drop trace. In the preferred embodiment, the actual coil power is continuously monitored for use by the filter.

Using the rod drop trace of FIG. 5, the operator is able to check for the proper and timely insertion of the rods 12 into the reactor core 14. The total rod drop time consists of a first time period 26 which is the time taken for the rod 12 to travel from the top of the reactor core 14 to the bottom and a second time period 28 which is the time taken for the rod 12 to come to rest after bouncing in the dashpot 16 at the bottom of the reactor core 14. Once the rod drop trace has been isolated from the coil power, the drop time is calculated and a report is automatically generated which may include the date and time of the event, the measured signal of FIG. 4, the rod drop trace of FIG. 5, and the calculated drop time. The test data is stored for later use. The reporting capabilities include the ability to overlie one plot upon another. This allows a direct graphical comparison of previous drop time measurements with instant measurements or of one rod 12 with another within a single test.

Accordingly, a method for measuring the drop time of the control and shutdown rods in a nuclear power plant has been disclosed. The measurement is taken while the coils encircling the rod housing remain energized and allows the drop time of all control and shutdown rods to be measured together in one test when the rods are dropped together into the reactor simultaneously. The method allows drop time measurements to be taken automatically in the event of an actual mishap or whenever the reactor is automatically shut down or scrammed (tripped). Additionally, unnecessary wear and tear on the switchgears controlling the coil power is avoided by eliminating the need to turn of the coil power. Finally, test results are available in real time providing the operator with an indication of the rod position while the test is in progress. Also, there is no need for a lengthy procedure to turn the power off to the rod position indication coils and the test can be performed on as many rods as desired at one time. This will reduce the test time which is of much interest in nuclear power plants from an economic standpoint.

While a preferred embodiment has been shown and described, it will be understood that it is not intended to limit the disclosure, but rather it is intended to cover all modifications and alternate methods falling within the spirit and the scope of the invention as defined in the appended claims

Having thus described the aforementioned invention, we claim:

1. A method for measuring the drop time of at least one control or shutdown rod in a nuclear reactor, said method comprising the steps of:

(a) releasing a rod from a resting position above a nuclear reactor core;

(b) guiding the rod through a plurality of energized coils;

(c) recording a signal present at the plurality of energized coils, said signal being recorded from said step of releasing a rod from a resting position above a nuclear reactor core until the rod comes to a resting position within the reactor core, said signal including both a coil power measurement and a rod drop trace, said coil power measurement including information about the instantaneous power of the plurality of energized coils, said rod drop trace including information about the electrical signal induced in the plurality of energized coils by the rod; and (d) filtering said signal to isolate the rod drop trace from coil power measurement to identify the drop time.

2. The method of claim 1 further comprising the step of calculating a rod drop time from the rod drop trace.

3. The method of claim 1 further comprising the step of applying a filter to isolate the rod drop trace from the coil power measurement to identify the drop time.

4. The method of claim 1 wherein the step of releasing the rod from a resting position above a nuclear reactor core further includes the step of releasing a plurality of rods simultaneously from a resting position above a nuclear reactor core.

5. The method of claim 4 further comprising the step of overlaying one rod drop trace obtained from one of the plurality of rods with another rod drop trace obtained from another of the plurality of rods.

6. The method of claim 1 further comprising the step of storing at least the rod drop trace obtained during said step of filtering said signal to isolate the rod drop trace from the coil the power measurement to identify the drop time.

7. The method of claim 6 wherein said step of storing at least the rod drop trace obtained during said step of filtering said signal to isolate the rod drop trace from coil power measurement to identify the drop time includes the step of storing said signal obtained during said step of filtering said signal to isolate the rod drop trace from the coil power measurement to identify the drop time.

8. The method of claim 6 wherein said step of storing at least the rod drop trace obtained during said step of filtering said signal to isolate the rod drop trace from coil power measurement to identify the drop time includes the step of storing the coil power measurement obtained during said step of filtering said signal to isolate the rod drop trace from the coil power measurement to identify the drop time.

9. The method of claim 6 further comprising the step of overlaying one rod drop trace with another rod drop trace from said step of storing at least the rod drop trace obtained during said step of filtering said signal to isolate the rod drop trace from the coil power measurement to identify the drop time.

10. A method for measuring a drop time of control and shutdown rods in a nuclear reactor having a coil-based rod position indication system, said method comprising the steps of:
    (a) releasing a rod from a resting position above a nuclear reactor core;
    (b) sensing a coil current from a coil-based rod position indication system;
    (c) separating an induced current representing a rod drop position trace from said coil current; and
    (d) calculating a rod drop time from said induced current.

11. A method for measuring a rod drop time of a rod in a nuclear reactor core having a coil-based rod position indication system, said method comprising the steps of:
    (a) sensing a coil current from a coil-based rod position indication system;
    (b) separating an induced current from said coil current;
    (c) determining a start time of a rod drop event from said induced current;
    (d) determining a first stop time of the rod drop event from said induced current, said first stop time representing a time at which the control rod initially reaches a fully inserted position within a reactor core; and
    (e) determining a second stop time of the rod drop event from said induced current, said first stop time representing a time at which the control rod comes to a resting position within the reactor core.

12. A method for measuring a drop time of a rod in a nuclear reactor core having a coil-based rod position indication system, said method comprising the steps of:
    (a) sensing a coil current from a coil-based rod position indication system;
    (b) separating an induced current representing a rod drop position trace from said coil current;
    (c) determining from said induced current a first time period representing a period of time for the rod to travel from a top position in a reactor core to a bottom position in the reactor core; and
    (d) determining from said induced current a second time period representing a period of time for the rod to come to rest after reaching the bottom position in the reactor core.

* * * * *